US008640234B2

(12) United States Patent
Gassen et al.

(10) Patent No.: US 8,640,234 B2
(45) Date of Patent: Jan. 28, 2014

(54) METHOD AND APPARATUS FOR PREDICTIVE AND ACTUAL INTRUSION DETECTION ON A NETWORK

(75) Inventors: Derek Gassen, Englewood, CO (US); Thomas P. Donahue, Littleton, CO (US)

(73) Assignee: Trustwave Holdings, Inc., Chicago, IL (US)

( * ) Notice: Subject to any disclaimer, the term of this patent is extended or adjusted under 35 U.S.C. 154(b) by 2931 days.

(21) Appl. No.: 10/838,863

(22) Filed: May 4, 2004
(Under 37 CFR 1.47)

(65) Prior Publication Data
US 2006/0150249 A1    Jul. 6, 2006

Related U.S. Application Data

(60) Provisional application No. 60/175,937, filed on May 7, 2003.

(51) Int. Cl.
*G06F 12/14* (2006.01)
(52) U.S. Cl.
USPC .............. 726/23; 726/22; 713/153; 713/155
(58) Field of Classification Search
USPC ........................................................ 726/23
See application file for complete search history.

(56) References Cited

U.S. PATENT DOCUMENTS

| | | | | |
|---|---|---|---|---|
| 4,885,789 A | * | 12/1989 | Burger et al. .................. | 713/164 |
| 5,371,807 A | | 12/1994 | Register et al. | |
| 5,414,833 A | * | 5/1995 | Hershey et al. ................. | 726/22 |
| 5,455,855 A | * | 10/1995 | Hokari ........................... | 379/229 |
| 5,541,836 A | | 7/1996 | Church et al. | |
| 5,694,335 A | * | 12/1997 | Hollenberg ...................... | 726/16 |
| 5,710,760 A | * | 1/1998 | Moll .............................. | 370/249 |
| 5,742,756 A | * | 4/1998 | Dillaway et al. ................ | 726/20 |
| 5,796,942 A | | 8/1998 | Esbensen | |
| 5,796,948 A | | 8/1998 | Cohen | |
| 5,805,801 A | * | 9/1998 | Holloway et al. ............... | 726/22 |
| 5,832,212 A | | 11/1998 | Cragun et al. | |
| 5,835,722 A | | 11/1998 | Bradshaw et al. | |
| 5,850,388 A | | 12/1998 | Anderson et al. | |

(Continued)

OTHER PUBLICATIONS

"Vericept VIEW Solutions VIEW for Network Security, " VERICEPT Corporation Product Brochure, Copyright 2001-2002, 4 pages. The Particular month is not in issue because the year of publication is sufficient earlier than the effective date U.S. filing date and any foreign priority.

(Continued)

*Primary Examiner* — Kambiz Zand
*Assistant Examiner* — Yonas Bayou
(74) *Attorney, Agent, or Firm* — Hanley, Flight & Zimmerman LLC

(57) ABSTRACT

A method of managing network usage by defining a set of linguistic patterns, where each linguistic pattern is associated with a condition that is to be monitored. Network packets are captured during transmission and analyzed to identify linguistic patterns. Captured network packets are scored based on similarity of at least one linguistic pattern to one or more of the defined set of linguistic patterns. When a packet that is scored above a specified threshold value is identified, at least one responsive action is implemented. In this manner, a system implementing the method is able to identify network traffic that is associated with prospective malicious activity and thereby provide an early warning before damage has occurred.

32 Claims, 4 Drawing Sheets

(56) References Cited

U.S. PATENT DOCUMENTS

| | | | |
|---|---|---|---|
| 5,870,559 A | | 2/1999 | Leshem et al. |
| 5,878,423 A | | 3/1999 | Anderson et al. |
| 5,884,033 A | | 3/1999 | Duvall et al. |
| 5,887,120 A | | 3/1999 | Wical |
| 5,905,859 A | * | 5/1999 | Holloway et al. ............... 726/22 |
| 5,930,788 A | | 7/1999 | Wical |
| 5,940,590 A | * | 8/1999 | Lynne et al. .................... 726/35 |
| 5,978,568 A | | 11/1999 | Abraham et al. |
| 5,983,214 A | | 11/1999 | Lang et al. |
| 5,983,270 A | | 11/1999 | Abraham et al. |
| 5,996,011 A | | 11/1999 | Humes |
| 6,061,675 A | | 5/2000 | Wical |
| 6,078,586 A | * | 6/2000 | Dugan et al. ............... 370/395.2 |
| 6,119,236 A | | 9/2000 | Shipley |
| 6,148,336 A | | 11/2000 | Thomas et al. |
| 6,226,664 B1 | | 5/2001 | Ng et al. |
| 6,266,664 B1 | | 7/2001 | Russell-Falla et al. |
| 6,336,117 B1 | | 1/2002 | Massarani |
| 6,366,910 B1 | | 4/2002 | Rajaraman et al. |
| 6,381,632 B1 | | 4/2002 | Lowell |
| 6,438,632 B1 | | 8/2002 | Kikugawa |
| 6,446,119 B1 | | 9/2002 | Olah et al. |
| 6,449,119 B1 | | 9/2002 | Hashizume et al. |
| 6,453,345 B2 | | 9/2002 | Trcka et al. |
| 6,477,551 B1 | | 11/2002 | Johnson et al. |
| 6,477,571 B1 | | 11/2002 | Ross |
| 6,487,666 B1 | | 11/2002 | Shanklin et al. |
| 6,539,375 B2 | | 3/2003 | Kawasaki |
| 6,633,855 B1 | | 10/2003 | Auvenshine |
| 7,016,951 B1 | | 3/2006 | Longworth et al. |
| 7,032,007 B2 | | 4/2006 | Fellenstein et al. |
| 7,315,891 B2 | | 1/2008 | Donahue |
| 7,577,739 B2 | | 8/2009 | Donahue |
| 7,613,766 B2 | | 11/2009 | Baba et al. |
| 8,234,328 B2 | | 7/2012 | Baba et al. |
| 2002/0004907 A1 | | 1/2002 | Donahue |
| 2002/0089606 A1 | | 7/2002 | Forler et al. |
| 2003/0145231 A1 | * | 7/2003 | Poletto et al. ................ 713/201 |
| 2004/0098622 A1 | * | 5/2004 | O'Neill ........................ 713/201 |
| 2005/0033849 A1 | | 2/2005 | Matz |
| 2005/0198523 A1 | * | 9/2005 | Shanbhag et al. ............ 713/200 |
| 2012/0271626 A1 | | 10/2012 | Baba et al. |

OTHER PUBLICATIONS

Non-final office action, issued by the United States Patent and Trademark Office in connection with U.S. Appl. No. 09/759,089, on Apr. 5, 2006, 28 pages.

Non-final office action, issued by the United States Patent and Trademark Office in connection with U.S. Appl. No. 09/759,089, on Sep. 29, 2005, 28 pages.

Non-final office action, issued by the United States Patent and Trademark Office in connection with U.S. Appl. No. 09/759,089, on Jun. 17, 2004, 23 pages.

Notice of Allowance and Fee(s) Due, issued by the United States Patent and Trademark Office in connection with U.S. Appl. No. 09/759,089, on Aug. 27, 2007, 7 pages.

Supplemental Notice of Allowability, issued by the United States Patent and Trademark Office in connection with U.S. Appl. No. 09/759,089, on Oct. 2, 2007, 4 pages.

Final office action, issued by the United States Patent and Trademark Office in connection with U.S. Appl. No. 09/759,089, on Nov. 29, 2006, 27 pages.

Final office action, issued by the United States Patent and Trademark Office in connection with U.S. Appl. No. 09/759,089, on Apr. 12, 2005, 30 pages.

Advisory action, issued by the United States Patent and Trademark Office in connection with U.S. Appl. No. 09/759,089, on Jun. 24, 2005, 3 pages.

Advisory action, issued by the United States Patent and Trademark Office in connection with U.S. Appl. No. 09/759,089, on Apr. 18, 2007, 3 pages.

Non-final office action, issued by the United States Patent and Trademark Office in connection with U.S. Appl. No. 11/951,848, on Dec. 9, 2008, 11 pages.

Notice of Allowance and Fee(s) Due, issued by the United States Patent and Trademark Office in connection with U.S. Appl. No. 11/951,848, on Jun. 30, 2009, 7 pages.

Non-final office action, issued by the United States Patent and Trademark Office in connection with U.S. Appl No. 10/748,677, on Oct. 15, 2008, 5 pages.

Non-final office action, issued by the United States Patent and Trademark Office in connection with U.S. Appl. No. 10/748,677, on Aug. 20, 2007, 13 pages.

Final office action, issued by the United States Patent and Trademark Office in connection with U.S. Appl. No. 10/748,677, on Mar. 26, 2009, 7 pages.

Final office action, issued by the United States Patent and Trademark Office in connection with U.S. Appl. No. 10/748,677, on Jun. 3, 2008, 16 pages.

Advisory action, issued by the United States Patent and Trademark Office in connection with U.S. Appl. No. 10/748,677, on May 27, 2009, 3 pages.

Notice of Allowance and Fee(s) Due, issued by the United States Patent and Trademark Office in connection with U.S. Appl. No. 11/748,677, on Sep. 21, 2009, 6 pages.

Non-final office action, issued by the United States Patent and Trademark Office in connection with U.S. Appl. No. 12/233,323, on Oct. 19, 2011, 5 pages.

Notice of Allowance and Fee(s) Due, issued by the United States Patent and Trademark Office in connection with U.S. Appl.No. 12/233,323, on Mar. 27, 2012, 7 pages.

Non-final office action, issued by the United States Patent and Trademark Office in connection with U.S. Appl. No. 13/535,332, on Mar. 15, 2013, 8 pages.

Notice of Allowance and Fee(s) Due, issued by the United States Patent and Trademark Office in connection with U.S. Appl. No. 12/535,332, on Aug. 26, 2013, 11 pages.

Sergeant, "Internet Level Spam Detection and SpamAssassin 2.50," MessageLabs, last modified Jan. 19, 2003, 22 pages.

Ranum et al., "Implementing a Generalized Tool for Network Monitoring," 1997, LISA XI, San Diego, California, Oct. 1997, www.usenix.org, 9 pages.

Mason, "Filtering Spam With SpamAssassin," http://SpamAssassin.org/, last modified on Nov. 3, 2002, 21 pages.

* cited by examiner

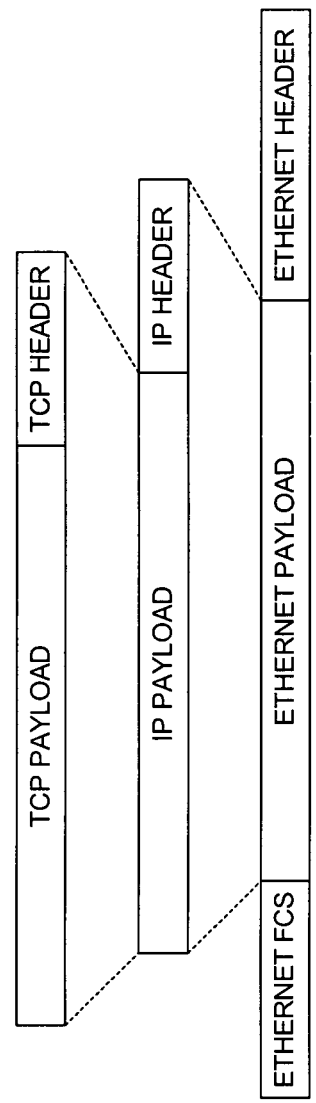
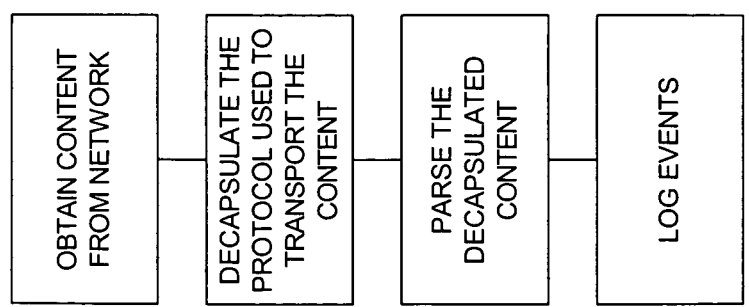
FIG. 4
FIG. 3

METHOD AND APPARATUS FOR PREDICTIVE AND ACTUAL INTRUSION DETECTION ON A NETWORK

BACKGROUND OF THE INVENTION

1. Field of the Invention

The present invention relates to systems and methods for monitoring network events. In particular, but not by way of limitation, the present invention relates to systems and methods for identifying attack preparation activities and/or successful network attacks.

2. Relevant Background.

Our world and the corporate environment are continually and rapidly changing. Increasing and expanding connectivity, disparate and widely distributed corporate systems, burgeoning new forms of communications, and the proliferation of data, place companies at risk and increase the need for information security.

Man has always collected, preserved, studied, analyzed, disbursed, published, and protected information. With the introduction of the computer into society and its rapid assimilation and growth in society, we have made the computer indispensable in our lives. While information is empowerment, the sheer magnitude of the information we collect, as well as the sensitivity of much of it, necessitates that we be cautious in its maintenance, storage and protection. Furthermore, our society has placed regulations upon our private and business lives necessitating that we are able to access and produce information years after we originally collect and store it, while maintaining complete confidentiality.

Because of the nature and complexity of our information-filled society, there is no standard definition for information security (infosec) but it's generally interpreted as a broad term encompassing many others. In very general terms, information security can be defined as protecting information, usually information that is stored, transported and/or managed using computers, from unauthorized use or access. More specifically, "physical security" deals with the physical protection we provide such as locking a facility or installing burglar alarms. "Network security" and computer security deal with protecting networks, specifically, and computers specifically, respectively.

The CSI/FBI Computer Crime and Security Survey, conducted annually since 1996, indicates a steady rise in the number of security breaches and cyber crimes. These crimes resulted in increased financial losses to the corporations involved and increased awareness that employee crime is also on the rise. While traditional information security methods focus on specific types of network crimes and monitor network activity, they fail to adequately address the actions taking place within the corporation. Studies show that while a large percentage of internal problems result from human errors and omissions, there is a significant increase of incidents due to social engineering, where employees are manipulated and persuaded to divulge proprietary company information.

One result that stands out in the various surveys conducted, is, that as the use of networks and the Internet increases, there is a rise in security breaches and attacks from within. These security breaches are, in some cases, accidental or unintentional. In other cases the breaches result from employees or other corporate insiders that are manipulated by social engineering by an outside attacker. In yet other instances employees are exploiting known vulnerabilities within a company's systems. As a result, there are an increasing number of instances employees are exploiting known vulnerabilities within the company systems.

While it is essential to increase employee security awareness through education and positive social engineering, there is also need to implement comprehensive solutions that include hardware and software to reinforce the security awareness training and social engineering. The larger the network and the more nodes and points of interconnection, the larger the number of vulnerabilities. Furthermore, information on the Internet can be accessed from anywhere in the world in real time. While this ability is good for the spread of information, it also allows for a significant amount of risk to the company network. Hence, it is vital for businesses with internal networks and connections to the Internet to ensure that their networks are secure. This is necessary in order to minimize the risk of intrusions both from insiders and outsiders. By concentrating on the three specific areas of monitoring, maintenance and implementation, companies can enhance their network security.

Currently existing security products tend to address one or two known vulnerabilities, but are not designed to deal with all the different types of vulnerabilities that exist within the company. A combination of products is usually required to protect the company by dealing with the different aspects and vulnerabilities of security. Importantly, these products tend to address vulnerabilities that exist in the hardware/software of the computer systems, and fail to address the information itself.

Until now the effort to fortify the perimeter has been a primary focus. Products such as firewalls are placed between the internal systems and public networks to prevent attacks from outside the organization. Firewalls are devices that monitor information packets and analyze characteristics such as source address/domain, destination address, protocols used in the packet, and the like. The firewall decides whether to forward the packet on to its destination by applying pre-specified rules to each packet. Firewalls have proven effective for limiting attacks from outside a corporate network. However, firewalls are not able to detect or prevent security breaches within a company's network.

Unfortunately, the greater overall threat to the network is from inside the company, rather than outside. Employees generally have legitimate access to the network and are cognizant of the security procedures in place. Using their access and their knowledge of how to circumvent the security in place, internal intruders can cause significant damage to the network. It's also quite common for access to be left open for terminated employees. This sometimes occurs because of negligence or a lack of knowledge, but it results in allowing former, and frequently disgruntled employees to access the network and do damage. In addition to errors and omissions, contributing to significant danger facing a company are Internet connections, social engineering by external attackers, disgruntled workers, and dishonest employees. Monitoring employee network activity can reveal potential and real information security exposure. This task involves maintaining visibility to the content of all forms of network traffic can alert management to the disclosure of company information via e-mail, Web-based e-mail, chat, internet messaging (IM), file transfer protocol (FTP), telnet, and other communication methods that currently exists or are developed in the future. Continually implementing improved procedures for assessing vulnerabilities allows companies to re-evaluate exposure and eliminate the vulnerabilities. Automated tools for network monitoring such as "packet sniffers" have been developed primarily for network troubleshooting. These tools analyze network protocols instead of the information carried by the various protocols and are used to assist network managers in identifying and resolving systemic network problems.

The more dangerous security breaches, however, tend to be acute, not systemic. Trusted employees who inadvertently do something wrong on an insufficiently protected system, disgruntled employees and former employees with an "axe to grind," pranksters who "break" weak passwords, and developers who leave backdoors in applications, all contribute to significant problems, damage, and monetary loss to organizations. As a result, these tools have limited usefulness as a primary tool for identifying inadvertent or intentional security breaches. Instead, companies rely primarily on acceptable use policies and continuous education of employees as to compliance with those policies. However, even the most diligent education and social engineering programs are not totally effective. A need exists for easy-to-use systems for monitoring internal network usage that is readily adaptable to new protocols and new security breaches.

Intrusion detection systems (IDS) come in two alternatives—NIDS (Network IDS) and HIDS (Host IDS). NIDS are usually deployed via security appliances that plug into the network or software that is installed on commercial off-the-shelf (COTS) computers. A NIDS usually has two logical components: a sensor and a management station or console. In its narrowest sense, a HIDS is an IDS that monitors platform and application event logs from multiple sources for suspicious activity. Host computers may include user workstations, peripherals, specialized servers such as Web servers, or network components. One of the limitations of most IDS solutions is their reliance on a limited database of known attack signatures. While some IDS solutions also analyze specific protocols for anomalies, they fall short of recognizing a substantial amount of illicit network activity, as they are unable to view and analyze the full content of network traffic.

Historically viruses have been defined as programs used to infect the operation of a computer system. Virus code may be written and buried within an existing program. Viruses can range from pranks that display a message on screen to programs that destroy programs and data. A particular virus can be characterized by a "signature" which is often a value that is taken from or derived from a portion of the binary code making up the virus. Virus scanning software looks for the signatures of known virus code and takes remedial action to warn users and/or prevent execution of the code. However, viruses are constantly evolving into new configurations that frequently overlap, blurring the definition and increasing the difficulty in diagnosing and eradicating them. Estimates are that thousands of new viruses appear daily.

Firewalls and email systems often include integrated virus scanning software to address virus code entering from outside a corporate network. However, once virus code is inside a network, either intentionally or inadvertently, detecting and containing the threat is more problematic. Virus scanning software on individual desktop computer and workstations is useful to contain a virus, but can be readily disabled either intentionally or inadvertently by a user. Moreover, ensuring that all workstations throughout an organization have up-to-date virus signature files is problematic. Additionally, an intentional attack may use virus code for which no signature yet exists, thereby rendering virus scanning software ineffective.

Blocking and filtering solutions involve techniques that protect an internal network by selectively cutting off access. Blocking may refer to a database of forbidden URLs or blocking of certain communication ports. Filters attempt to analyze requested pages or the content of e-mail headers. Of the variety of blocking and filtering solutions available for networks, some come with the operating system and others can be purchased separately. Unfortunately, blocking filtering solutions can be readily circumvented. For instance, companies frequently install blocking software that doesn't permit their employees to access certain Web sites that they disapprove of (i.e. pornographic). However, an employee can do a search for free Web-mail and get thousands of hits. It is only a matter of trying a few before the employee discovers one that is not blocked by the installed blocking software. Thus, it's possible to circumvent the blocking and filtering software and import or export information without company knowledge and approval.

Significantly, all of these systems tend to be reactive, not proactive. In other words, they are designed to detect a security breach after it occurs and may include tools to aid in the forensic analysis of a completed or ongoing attack. However, they do not include tools to proactively identify an attack before it occurs. Accordingly, a need exists for software, systems and methods that can predict an intrusion detection and enable remedial action before a security breach has occurred within a network.

SUMMARY OF THE INVENTION

Briefly stated, the present invention involves a method of managing network usage by defining a set of linguistic patterns, where each linguistic pattern is associated with a condition that is to be monitored. Network packets are captured during transmission and analyzed to identify linguistic patterns. Captured network packets are scored based on similarity of at least one linguistic pattern to one or more of the defined set of linguistic patterns. When a packet that is scored above a specified threshold value is identified, at least one responsive action is implemented. In this manner, a system implementing the method is able to identify network traffic that is associated with prospective malicious activity and thereby provide an early warning before damage has occurred.

BRIEF DESCRIPTION OF THE DRAWINGS

Various objects and advantages and a more complete understanding of the present invention are apparent and more readily appreciated by reference to the following detailed description and to the appended claims when taken in conjunction with the accompanying drawing wherein:

FIG. 3 is a flowchart of one method for providing network security in accordance with the principles of the present invention; and FIG. 4 illustrates decapsulation of an exemplary IP/Ethernet packet.

DETAILED DESCRIPTION OF THE PREFERRED EMBODIMENTS

The present invention is illustrated and described in terms of a networked computer system in which predictive and reactive network content monitoring is performed by software processes implemented on a computer attached to a network. However, the present invention may be implemented in hardware, software, firmware, and/or hybrid systems to meet the needs of a particular application. Further, the present invention may be implemented on any network, sub-network, or data communication connection.

Embodiments of the present invention provide systems and methods for providing network security. One embodiment, for example, provides network protection by identifying attack preparation activities. Other embodiments provide network protection by identify successful network attacks. These two embodiments utilize linguistic analysis of captured network traffic to recognize the potential network threats.

The present invention is delivered, for example, in the form of a security device that plugs directly into an organization's network, usually into the monitoring port of a switch. The devices allows a user to specify a set of rules or select from sets of pre-specified rules that define boundaries of appropriate use. The device passively (i.e., without interrupting the actual message flow) captures all TCP/IP traffic then analyzes traffic for content that falls outside of the boundaries of appropriate use. Innocuous traffic is discarded by the system. However, a copy of inappropriate content is retained on the device, as is the name of the user, workstation, and/or IP address associated with the activity. Summary level reporting is provided for management review, while detailed access to the exact content of individual infractions is accessible via a few clicks in the browser-based interface.

Figure 1:
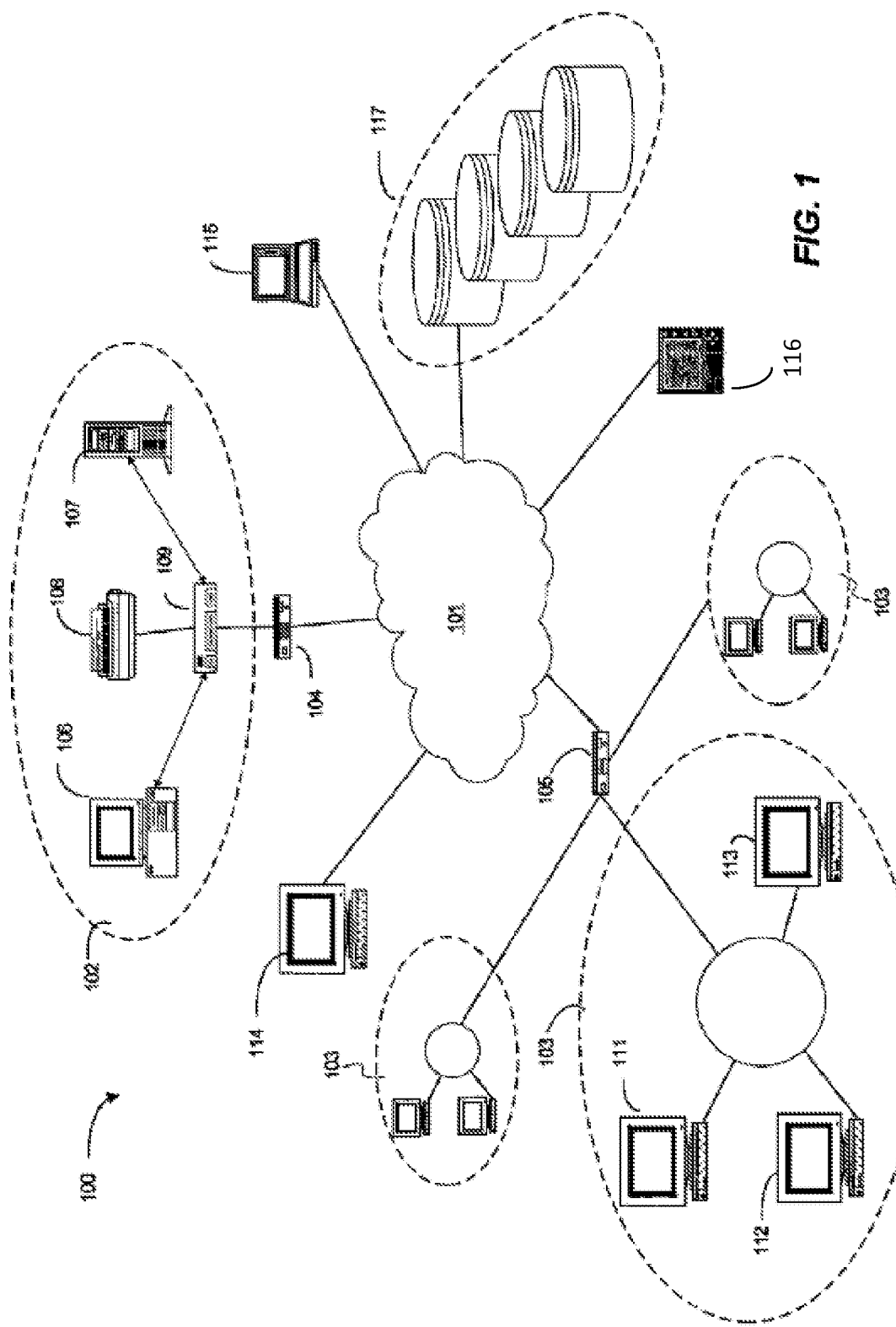
FIG. 1 illustrates a network computing environment in which the present invention is implemented.

FIG. 1 shows an exemplary computing environment 100 in which the present invention may be implemented. Essentially, a number of computing devices and groups of devices are interconnected through a network 101. For example, a LAN 102 and a LAN 103 are each coupled to network 101 through gateway machines 104 and 105 respectively. Gateway machines 104, 105 may comprise routers, switches, hugs, and other devices that enable inter-networking of networks 102 and sub-networks 103. LANs 102 and 103 may be implemented using any available topology such as a hub and spoke topology of LAN 102 and a loop topology of LAN 103. LANs 102 and 103 may implement one or more server technologies including, for example a UNIX, Novell, or Windows NT, or peer-to-peer type network. Each network will include distributed storage implemented in each device and typically includes some mass storage device coupled to or managed by a server computer. Network 101 comprises, for example, a public network such as the internet or another network mechanism such as a fibre channel fabric or conventional WAN technologies.

The present invention is implemented in any network-coupled machine such as workstations 111, 112, 113 to monitor protect devices within that sub-network 103. The present invention may be implemented in a connection devices such as gateway 105 to monitor and protect all sub-networks 103 coupled to device 105. In this manner the present invention can be employed as desired to monitor and protect all or any part of a LAN.

LAN 102 includes one or more workstations such as personal computer (PC) 106. LAN 102 also includes a server machine 107 and one or more shared devices such as printer 108. A hub or router 109 provides a physical connection between the various devices in LAN 102. Router 104 is coupled through gateway 109 to provide shared access to network 101. Gateway 109 may implement any desired access and security protocols to manage access between network 101 and devices coupled to network 102. Similarly, network 103 comprises a collection of workstations 111, 112 and 113 that share a common connection to network 101 through gateway 105.

Distributed computing environment 100 further includes a wide variety of devices that have a logical connection to the network supported by a physical connection to external network 101. For example, a stand alone workstation 114 may couple to network 101 through a modem or other suitable physical connection. Likewise, notebook computer 115 and palmtop computer 116 may connect to network 101 using known connection technologies. It is contemplated that a wide variety of devices may join the distributed network 100 including mobile phones, remote telemetry devices, information appliances, and the like.

Each of the devices shown in FIG. 1 may include memory, mass storage, and a degree of data processing capability sufficient to manage their connection to network 101. The computer program devices in accordance with the present invention are implemented in the memory of the various devices shown in FIG. 1 and enabled by the data processing capability of the devices shown in FIG. 1. In addition to local memory and storage associated with each device, it is often desirable to provide one or more locations of shared storage such as disk farm 117 that provides mass storage capacity beyond what an individual device can efficiently use and manage. Selected components of the present invention may be stored in or implemented in shared mass storage such as disk farm 117.

Figure 2A:
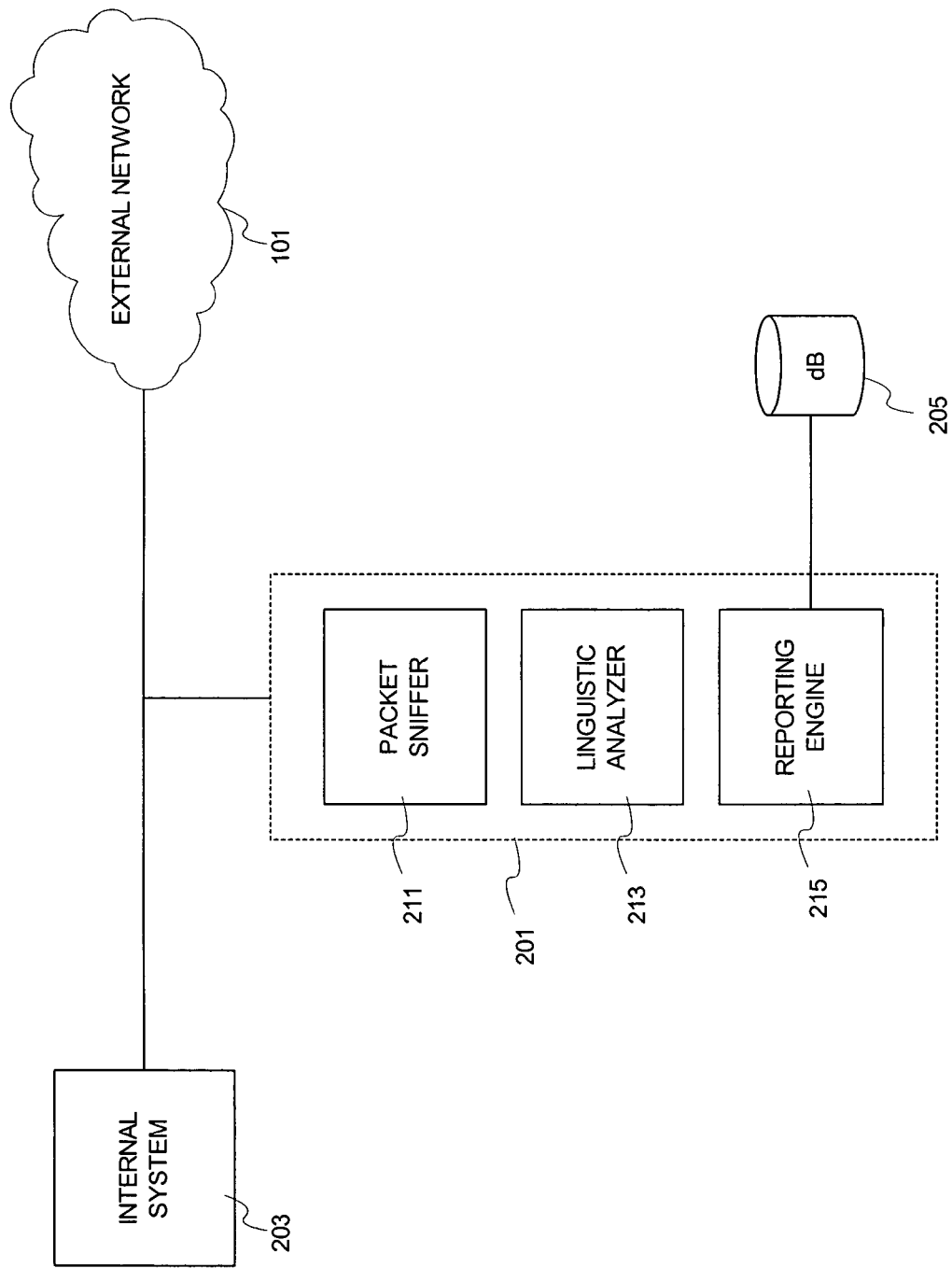
FIG. 2A and FIG. 2B illustrate systems for providing network security in accordance with the principles of the present invention in block diagram form.

FIG. 2A illustrates a system in accordance with an embodiment of the present invention for providing network security in accordance with the principles of the present invention. This embodiment includes a network analyzer 201 that is configured to monitor network traffic between the network, internal or external, and the internal computer system 203. Notably, some embodiments of the network analyzer 203 can be coupled directly to the internal computer system or to a router that links the internal computer system with the Internet.

Figure 2B:
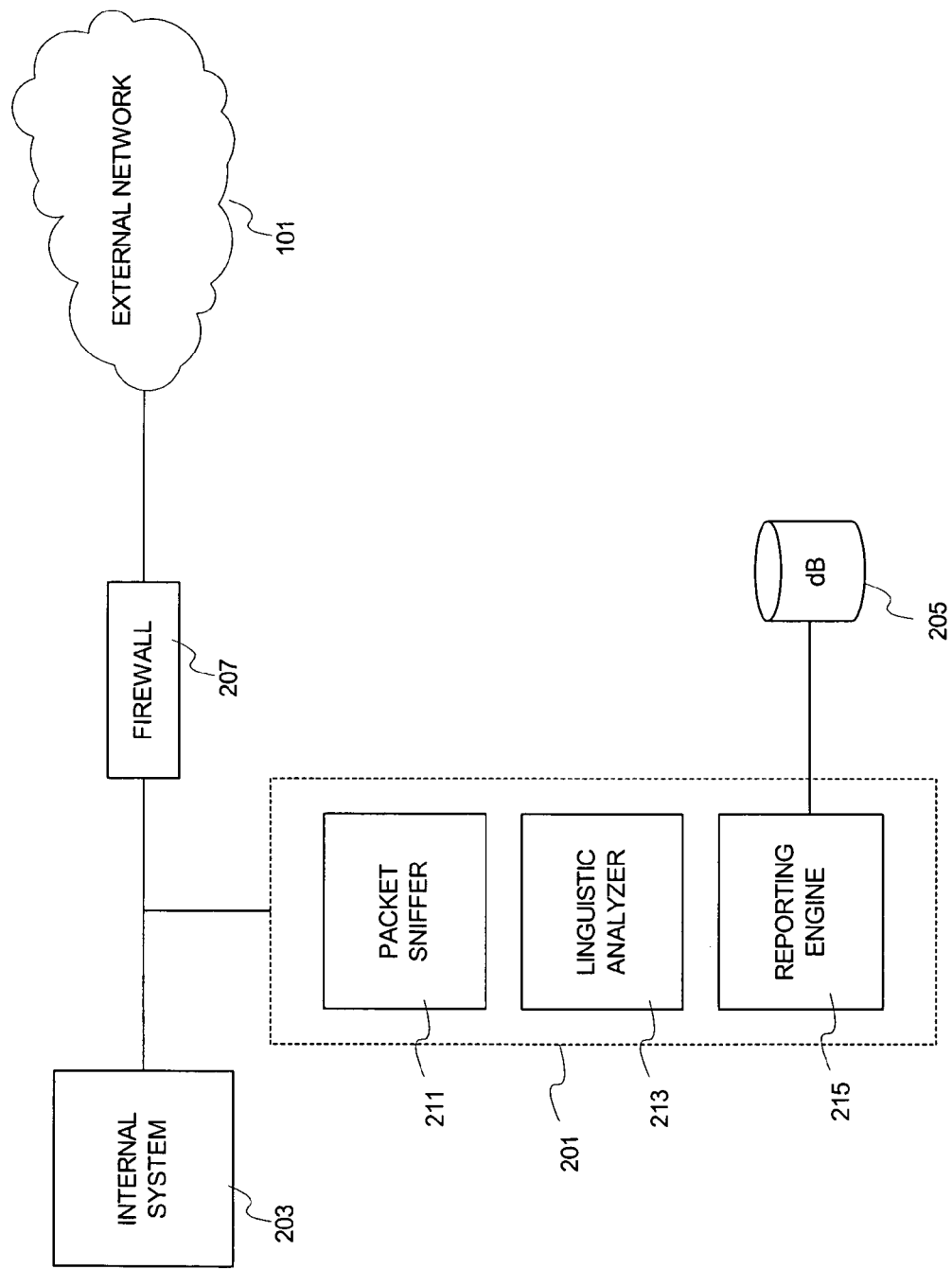

FIG. 2B illustrates a system in accordance with another embodiment of the present invention in which a network analyzer 201 is specifically located within a corporate firewall 207 that protects internal system 203. When a firewall 207 is in use, the network analyzer 201 is preferably located on the internal system side of the firewall so that it can see monitor network traffic within the internal system 203, including network traffic that is destined for external network 101. In other respects, the implementation of FIG. 2A is similar to the implementation of FIG. 2B.

Network analyzer 201 includes three components: a packet sniffer 211, a linguistic analyzer 213, and a reporting engine 215. Each of these components may be implemented as separate modules or software processes executing within network analyzer 201. In a particular implementation, network analyzer 201 comprises a personal computer, workstation, or network appliance executing an operating systems such as Linux (or other Unix variants), Microsoft Windows, or the like. The hardware used to implement network analyzer 201 includes sufficient resources to implement the application software described herein as well as support connections to other devices such as storage for database 205 and network connections.

Database 205 implements data structures that store a library of linguistic patterns (e.g., words, phrases, and the like) that are of interest. A linguistic pattern is of interest when it is logically and/or empirically associated with network communications of a particular type. In the particular examples herein, several categories of network communications are of interest and each category will have a set of words and phrases defined. The linguistic patterns may be updated as frequently as necessary to allow the system in accordance with the present invention to adapt to current user needs. The linguistic patterns may be expressed as regular expressions ("regex"), which are sets of symbols and syntactic elements used to represent patterns of text. The linguistic patterns may alternatively or in addition be expressed as rules or complex expressions that indicate words, groups of words, partial words, N-grams, min/max proximity between words, and the like.

The packet sniffer 211 is responsible for capturing traffic transmitted between the internal computer system 203 and other devices within computer system 203 or external network 101. Internal computer system 203 may comprise a single computer or multiple computing devices. For example, the packet sniffer 211 can passively capture all TCP/IP traffic between the internal computer system and the network. By "passively capture" it is meant that the network traffic is not blocked, but is instead captured for analysis. In other embodiments, the packet sniffer can actively capture the traffic. While implementations in which traffic is temporarily blocked are contemplated, such systems may add undesired complexity and latency in network communication.

Once the traffic has been captured, linguistic analyzer 213 is responsible for analyzing the linguistic patterns and the transmission protocols of the captured traffic to determine whether the traffic is a threat to network security. For example, the linguistic analyzer may decapsulate the protocol used to transfer data, analyze the linguistic patterns of the data present in the payload portion of the packet, and assign a score to the data based upon a degree to which the linguistic patterns of a particular packet are similar to linguistic patterns. Although some decisions can be made on protocol information alone which is available in packet headers, linguistic analyzer 213 enables analysis of the information contained within a packet. Linguistic patterns may comprise preselected words and/or terms, words/terms that occur with particular frequency, numerical data, and the like. This information may include keywords that identify sensitive information such as "patent disclosure", "product launch", "quarterly earnings", "job application", and the like. Similarly, the information may include names of key individuals, names of competitors, and the like. The present invention contemplates that the specific implementation and functionality of linguistic analyzer 213 will vary to meet the needs of a particular application.

Once the score meets a threshold, the reporting engine 215 generates a report for the category corresponding to the threshold. In alternate embodiments, the reporting engine 215 could be responsible for the scoring and categorization in addition to the report generation. Scoring techniques are described in commonly owned U.S. patent application Ser. No. 09/759,089 entitled Employee Internet Management Device, which is incorporated herein by reference.

In one embodiment, the linguistic analyzer categorizes certain network traffic as hacker research, preparation for attack, successful attack, and/or suspicious activity. For example, if the linguistic analyzer determines that certain network activity is related to researching typical hacker tools of the trade, such as stack smashing, the linguistic analyzer might classify that network activity as "hacker research" and store an entry in the log. A typical log entry could indicate IP addresses, user names, offending content, time stamps, etc.

FIG. 3 is a flowchart of an exemplary method for providing network security in accordance with the principles of the present invention. In FIG. 3 content is initially obtained from the network through techniques such as passive capture.

Once the content is obtained from the network, the transmission protocol corresponding to the content is decapsulated. FIG. 4 illustrates decapsulation of an exemplary IP/Ethernet packet. Packets using other protocols have similar payload/header structure and would be decapsulated in an analogous fashion. The TCP payload contains data that is used by a particular application, such as a file transfer program, web browser, mail client, and the like. The TCP header includes information describing the protocol of the payload data. For example, the transmission protocol could be identified as Microsoft 8 MB or CIFS (common Internet file system), Netbios, Virtual Network Computer (VNC) server, VNC client, telnet, smtp, http, GoToMyPC, etc. The type of protocol used can be used to score and categorize the captured content. In another embodiment, the type of protocol is used to provide context for scoring the actual content.

After the captured content has been decapsulated, it can be normalized for efficient linguistic analysis and then parsed to identify problematic data elements such as strings, phrases, files, and the like. If appropriate, the captured content can then be assigned to one of the network security categories: hacker research, preparation for attack, successful attack, and/or suspicious activity. Other categories can be pre-defined or user-defined to meet the needs of a particular application.

As its name suggests, the hacker research category relates to network events that indicate that employees are researching methods and tools for hacking. For example, employee research on exploits, worms and security information would fall within the hacker research category. Such activity can be identified by network packets in, for example, HTTP traffic that include keywords and phrases related to concepts such as hacking, password cracking, warez software and the like.

The preparation for attack category relates to network activities that indicate that a network attack could be imminent. This category involves network packets that may contain malicious source code in addition to or instead of research associated with hacking. Typical events that fall within this category include: detection of log wiping code, detection of the output of a NMAP, detection of sniffer code, detection of stack smashing code, and detection of suspicious VNC sessions.

The successful attack category relates to network events that indicate that the system is likely compromised. Typical events that fall within this system include, detection of a backdoor, detection of hacker-like root activity, detection of suspicious FTP activity, detection of HTTP responses most typical of Web server exploits, and detection of a suspicious startup daemon (SUDD) root messages.

The suspicious activity category relates to activities associated with unusual system administrator activity, non-RFC compliant client software, and hack activities. Typical examples of such activities include hacker research, GoToMyPC client or server activity, suspicious IMAP activity, suspicious POP activity, suspicious shell commands, and suspicious VNC session activity.

The network security category relates to the unauthorized access attempts category. Network events in this category include unauthorized access attempts on a FTP server, unauthorized access attempts other than FTP, MAP, and POP, unauthorized access attempts on an IMAP server, and unauthorized access attempts on a POP server.

As the captured content is parsed, scores can be assigned based on identified strings. In one embodiment, scores can be assigned to multiple categories for the same string. For example, an identified string might be indicative of hacker research (e.g., a connection to a Usenet group associated with hacking). Consequently, ten points could be award to the hacker research category. The same string, however, might be only slightly indicative of a preparation for an attack (e.g., information related to DVD disk security), so five points would be awarded to the preparation for an attack category.

The combination of these scores through simple algorithmic combination or according to more complex mechanisms such as weighted averages and the like is contemplated. The points assigned to each category may be totaled for each string in the captured content and a determination made as to whether the captured content falls within any of the categories. When the captured content falls within a category, an appropriate entry is stored in a log. Alternatively, an administrator could be actively notified when content falls within a certain category.

In particular implementations the system in accordance with the invention recognizes and reports on network traffic that indicates hacker preparation activity, such as hacker research, downloading of hacker programs and one-to-one communication discussing hacking methods and/or techniques. Visibility to the hacker-related types of network traffic content provides a unique "early warning" system for anticipating probable hacking attempts. These early warning signals also expose real or potential hackers within an organization.

While activities in preparation of an attack may be suggested by certain activities that can be monitored using protocol information (e.g., file transfers, newsgroup access, and the like), protocol information by itself is not particularly reliable. The present invention allows the content of network packets to be used as a source of more reliable information. The information content is typically represented as ASCII characters or that will indicate the nature of the information being transacted. Depending on the particular communication being monitored, either request packets, response packets, or both may contain useful content information.

A typical example is a packet that contains source code for programming that will launch an attack. Transferring malicious source code is a strong indicator of an someone taking actions in preparation of an attack, and so demonstrates how the present invention may be used as an early warning system to allow that will detect an attack before it occurs. Examples of such source code are available on the Internet from a variety of sources. The source code is not executable and so will pass by most filters, blocks, and virus scanning software. The source code can be downloaded by a variety of protocols including HTTP, FTP, email, and the like. Hence, conventional systems for protecting a network perimeter are not effective. However, the source code itself, which is transported in text form, will include words and terms that are indicative of malicious intent. Source code may contain terms such as "stacksmasher", "logwiper" or "sniffer" which would identify the source code as potentially troublesome. Linguistic analysis can readily distinguish this type of source code from ordinary text, or from desirable source code related to legitimate corporate purposes.

Specific implementation of the present invention may be used to detect and report:
Unauthorized access attempts for file transfer protocol (FTP), Internet message access protocol (IMAP), post office protocol (POP) and other protocols
Root activity characteristic of hackers such as viewing password files
Suspicious activity such as attempts to gain "superuser" rights, "Setuid root", and generating Nmap output within a shell session
The creation of "backdoors" on critical systems
Packets containing these types of information are examples of activities that might suggest an attack in the planning stage.

The present invention recognizes and reports on network traffic information related to potential and actual leaks of confidential and proprietary information. examples of the types of leaks that can be captured include:
Financial information posted to an Internet bulletin board
Customer data sent to a competitor via Web-mail
Bank account numbers or patient information in an Instant Message
Premature announcements of M&A activity in a chat room The increasing popularity of instant messaging, chat and Web-based e-mail creates a expanding need for comprehensive monitoring of all network traffic. Failure to monitor for, and act such breaches of information security result in billions of dollars in corporate losses annually. The present invention offers a unique and compelling approach to minimizing those losses.

Various implementations of the present invention offer advanced customization to monitoring customer networks. This feature enables monitoring to be readily adapted to the particular needs of a particular environment and particular risks. Custom Analysis enhances key-word analysis and takes it to a new level, by providing customers the power of extended regular expressions (EREs). The result is customized content monitoring analysis that is unparalleled in its accuracy, intelligence and effectiveness.

Examples of content that could be captured in accordance with the present invention include:
Specific trade secrets or intellectual property
General counterintelligence such as communications with competitors
Company specific jargon or project code names
A known signature for a virus that has penetrated the network The present invention is preferably implemented in a real time or substantially real time monitoring system within a corporate network. In such an implementation network traffic is passively or actively monitored and some form of responsive action is taken when a packet or series of packets are analyzed and produce metrics in excess of particular thresholds. The remedial action may involve a notification to IT personnel, generating an entry in a log file, interruption of network services, redirection of network services, or similar action. Alternatively, the present invention can be implemented in a non-real time fashion by logging network packets for later analysis and reporting. Moreover, a hybrid of both real time and logged operation is contemplated.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A method of managing network usage, the method comprising:
defining a set of linguistic patterns, where each linguistic pattern is associated with a condition that is to be monitored;
capturing network packets containing content during transmission;
decapsulating the captured network packets;
identifying linguistic patterns in the content of the captured network packets;
scoring captured network packets based on similarity of at least one of the identified linguistic patterns to one or more of the defined set of linguistic patterns; and when a packet that is scored above a specified threshold value is identified, implementing at least one responsive action.

2. The method of claim 1 further comprising:
defining a set of categories, wherein each category is associated with a set of linguistic patterns for that category; and
categorizing network packets into one or more of a plurality of categories based upon similarity to one or more of the set of linguistic patterns for that category.

3. The method of claim 1 wherein the capturing comprises passively capturing.

4. The method of claim 1 wherein the capturing comprises actively capturing.

5. The method of claim 1 wherein the decapsulating comprises:
determining from packet header information a type of application layer protocol used by the packet; and
parsing the packet to extract the content from the packet.

6. The method of claim 5 wherein the type of protocol identified in the decapsulating is used to score and categorize the packet.

7. The method of claim 5 wherein the type of protocol identified in the decapsulating is used to provide context for scoring the packet.

8. The method of claim 1 further comprising normalizing information from the decapsulated network packets.

9. The method of claim 1 further comprising parsing the information from the decapsulated network packets.

10. The method of claim 1 further comprising generating a report comprising categorized information of the network packets.

11. A tangible computer readable storage disk or device comprising instructions that, when executed, cause a machine to at least:
define a set of linguistic patterns, where each linguistic pattern is associated with a condition that is to be monitored;
capture network packets containing content during transmission;
decapsulate the captured network packets;
identify linguistic patterns in the content of the captured network packets;
score captured network packets based on similarity of at least one of the identified linguistic patterns to one or more of the defined set of linguistic patterns; and
when a packet that is scored above a specified threshold value is identified, implement at least one responsive action.

12. A monitored networked computing system comprising:
a network;
a plurality of computing devices coupled to the network and configured to exchange information packets containing packet information and content;
a network analyzer coupled to the network, wherein the network analyzer includes mechanisms for capturing the information packets; and
a linguistic analyzer coupled to the network analyzer and operable to identify preselected linguistic patterns in the content of the captured information packets, wherein the linguistic patterns are preselected to identify the information packets that preemptively indicate a future network attack.

13. The monitored network of claim 12 wherein the linguistic analyzer is operable to assign a score based upon a degree to which the linguistic patterns of a particular packet are similar to the preselected linguistic patterns.

14. The monitored network of claim 12 wherein the network analyzer and the linguistic analyzer operate in substantially real time.

15. The monitored network of claim 12 wherein the network analyzer passively captures information packets.

16. The monitored network of claim 12 further comprising means for decapsulating protocol information from the information packet and using the protocol information.

17. The monitored network of claim 12 further comprising a database coupled to the linguistic analyzer for storing the preselected linguistic patterns for each of a plurality of categories.

18. The monitored network of claim 17 wherein the preselected linguistic patterns are represented as regular expressions.

19. The monitored network of claim 12 wherein the network comprises an internet protocol network.

20. The monitored network of claim 12 wherein the network comprises a fibre channel fabric.

21. The monitored network of claim 12 further comprising a report generator coupled to the linguistic analyzer and operable to generate reports based on a categorization of the captured information packets.

22. A device for monitoring network traffic, the device comprising:
a memory comprising instructions; and
a processor to execute the instructions to:
capture network packets containing packet information and content from a network;
identify linguistic patterns in the content of the captured network packets;
score captured network packets based on similarity of at least one of the identified linguistic patterns to one or more of a defined set of linguistic patterns; and
implement at least one responsive action when a packet that is scored above a specified threshold value is identified.

23. A computing device configured to monitor content of network traffic, the computing device comprising:
a processor;
memory coupled to the processor;
a port coupled to an external network; and
computer code executable using the processor and the memory and operable to analyze linguistic patterns in the network traffic content and thereby identify network traffic on the external network by comparing the linguistic patterns in the network traffic to known linguistic patterns.

24. The computing device of claim 23 wherein the computer code is operable to detect network traffic associated with hacker research activity.

25. The computing device of claim 23 wherein the computer code is operable to detect network traffic associated with malicious attack preparation activity.

26. The computing device of claim 23 wherein the computer code is operable to detect network traffic associated with a successfully initiated attack.

27. The computing device of claim 23 wherein the computer code is operable to detect network traffic associated with unauthorized access attempts made to a network resource other than the computing device itself.

28. The computing device of claim 23 wherein the computer code is operable to detect linguistic patterns in the network traffic.

29. The computing device of claim 28 wherein the computer code is operable to score network traffic based on similarity of at least one detected linguistic pattern to one or more preselected linguistic patterns.

30. A method of detecting a prospective network attack, the method comprising:
defining a set of linguistic patterns, where each linguistic pattern is associated with a condition that has been determined to be indicative of a prospective network attack;
monitoring content of network traffic over time;
identifying linguistic patterns when they occur in the network traffic;
accumulating information about the identified occurrences of the defined set of linguistic patterns over time; and
using the accumulated information as a basis for determining, using a processor, a likelihood of a prospective network attack.

31. The method of claim 30 further comprising reporting an occurrence of network traffic when the occurrence of the linguistic patterns in the network traffic exceeds a preselected threshold.

32. The method of claim 30 wherein the accumulating information further comprises maintaining a score based on similarity of at least one identified linguistic pattern to one or more of the defined set of linguistic patterns; and
when the score exceeds a specified threshold value, implementing at least one responsive action.

* * * * *

UNITED STATES PATENT AND TRADEMARK OFFICE
CERTIFICATE OF CORRECTION

| | |
|---|---|
| PATENT NO. | : 8,640,234 B2 |
| APPLICATION NO. | : 10/838863 |
| DATED | : January 28, 2014 |
| INVENTOR(S) | : Derek Gassen and Thomas P. Donahue |

It is certified that error appears in the above-identified patent and that said Letters Patent is hereby corrected as shown below:

Title Page, item [60]

Related U.S. Application Data:

replace "Provisional application No. 60/175,937, filed on May 7, 2003" with
--Provisional application No. 60/468,578, filed on May 7, 2003--.

Signed and Sealed this
Eighth Day of July, 2014

Michelle K. Lee
*Deputy Director of the United States Patent and Trademark Office*